United States Patent
Ide

(10) Patent No.: US 7,507,010 B2
(45) Date of Patent: Mar. 24, 2009

(54) SURFACE LIGHT SOURCE DEVICE AND DISPLAY DEVICE

(75) Inventor: Naoto Ide, Fukaya (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 235 days.

(21) Appl. No.: 11/584,527

(22) Filed: Oct. 23, 2006

(65) Prior Publication Data

US 2007/0035966 A1 Feb. 15, 2007

Related U.S. Application Data

(63) Continuation of application No. PCT/JP2005/007249, filed on Apr. 14, 2005.

(30) Foreign Application Priority Data

Apr. 23, 2004 (JP) .............. 2004-128019

(51) Int. Cl.
*F21V 7/04* (2006.01)
*G02F 1/13357* (2006.01)

(52) U.S. Cl. .............. 362/613; 362/611; 362/561; 362/252; 349/65

(58) Field of Classification Search ............ 362/612, 362/613, 555, 26, 252, 611, 561; 349/62, 349/65
See application file for complete search history.

(56) References Cited

U.S. PATENT DOCUMENTS

| | | | | |
|---|---|---|---|---|
| 739,845 A | * | 9/1903 | Evans | 40/432 |
| 2,175,072 A | * | 10/1939 | Wompey | 40/432 |
| 4,992,704 A | * | 2/1991 | Stinson | 315/312 |
| 5,343,375 A | * | 8/1994 | Gross et al. | 362/248 |
| 5,463,280 A | * | 10/1995 | Johnson | 315/187 |
| 5,688,042 A | * | 11/1997 | Madadi et al. | 362/240 |
| 5,949,347 A | * | 9/1999 | Wu | 40/570 |
| 6,409,361 B1 | * | 6/2002 | Ikeda | 362/240 |
| 6,452,217 B1 | * | 9/2002 | Wojnarowski et al. | 257/99 |
| 6,561,661 B2 | * | 5/2003 | Egawa | 362/27 |
| 6,621,222 B1 | * | 9/2003 | Hong | 315/51 |
| 6,853,151 B2 | * | 2/2005 | Leong et al. | 362/240 |
| 6,991,351 B1 | * | 1/2006 | Petrick | 362/249 |
| 7,097,339 B2 | * | 8/2006 | Chou et al. | 362/612 |
| 2003/0048628 A1 | * | 3/2003 | Lee et al. | 362/27 |
| 2003/0169585 A1 | * | 9/2003 | Okuwaki | 362/31 |
| 2005/0141244 A1 | * | 6/2005 | Hamada et al. | 362/612 |
| 2005/0185418 A1 | * | 8/2005 | Peng et al. | 362/555 |
| 2006/0227570 A1 | * | 10/2006 | Rutherford et al. | 362/612 |

(Continued)

FOREIGN PATENT DOCUMENTS

JP 6-186528 A 7/1994

(Continued)

*Primary Examiner*—Ismael Negron
(74) *Attorney, Agent, or Firm*—Oblon, Spivak, McClelland, Maier & Neustadt, P.C.

(57) ABSTRACT

A surface light source device includes a light source unit, a reflector that is disposed to surround the light source unit, and reflects radiation light from the light source unit, and a light guide having an incidence surface on which the radiation light from the light source unit is incident, and an emission surface from which incident light that is incident through the incidence surface is emitted. The light source unit includes a plurality of point light sources with different major radiation directions.

13 Claims, 7 Drawing Sheets

U.S. PATENT DOCUMENTS

2006/0279964 A1* 12/2006 Kitamura .................... 362/620

FOREIGN PATENT DOCUMENTS

| JP | 6-296045 A | 10/1994 |
|---|---|---|
| JP | 10-107326 A | 4/1998 |
| JP | 10-177170 A | 6/1998 |
| JP | 2000-231344 A | 8/2000 |
| JP | 2002-270020 A | 9/2002 |
| JP | 2003-141918 A | 5/2003 |
| JP | 2003-187622 A | 7/2003 |
| JP | 2003-187623 A | 7/2003 |
| JP | 2004-103310 A | 4/2004 |

* cited by examiner

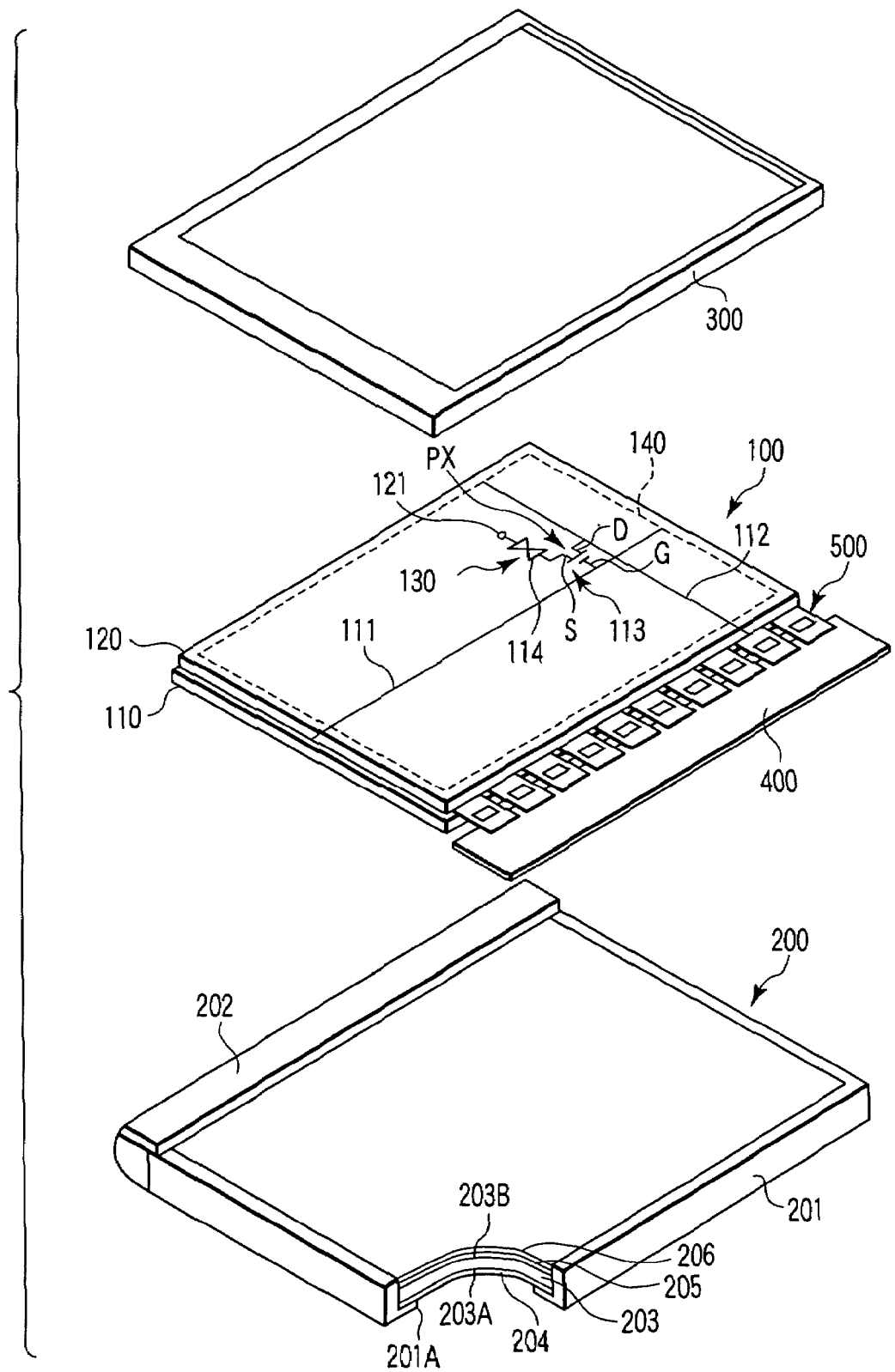
F I G. 1

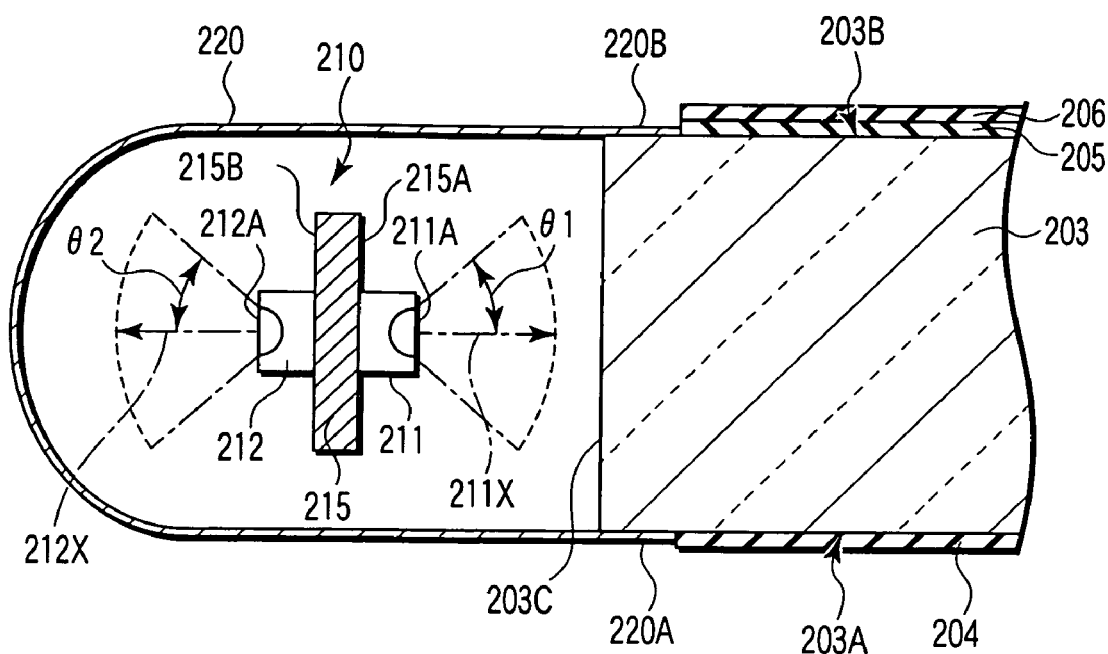
F I G. 2
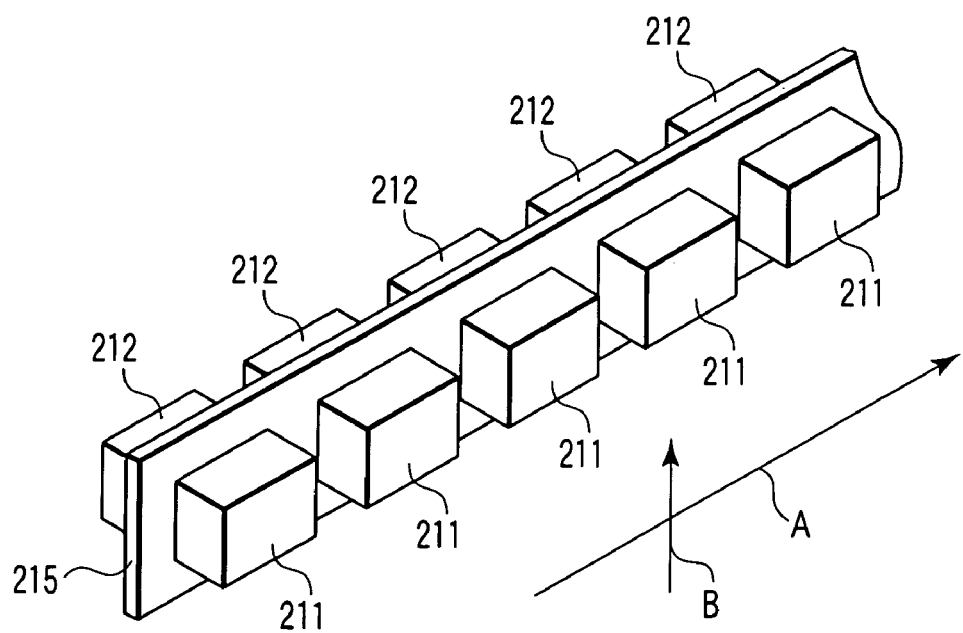
F I G. 3

SURFACE LIGHT SOURCE DEVICE AND DISPLAY DEVICE

CROSS-REFERENCE TO RELATED APPLICATIONS

This is a Continuation Application of PCT Application No. PCT/JP2005/007249, filed Apr. 14, 2005, which was published under PCT Article 21(2) in Japanese.

This application is based upon and claims the benefit of priority from prior Japanese Patent Application No. 2004-128019, filed Apr. 23, 2004, the entire contents of which are incorporated herein by reference.

BACKGROUND OF THE INVENTION

1. Field of the Invention

The present invention relates to a surface light source device and a display device, and more particularly to a surface light source device including, as light sources, point light sources that are composed of self-luminous elements, and a display device such as a liquid crystal display device, which includes the surface light source device.

2. Description of the Related Art

A display device, for instance, a liquid crystal display device, includes a surface light source device that illuminates a back side of a transmissive liquid crystal display panel. The surface light source device includes a light guide having one side surface as an incidence surface and having one major surface as an emission surface, a light source unit that is disposed to face the incidence surface of the light guide, and a reflector that is so disposed as to surround the light source unit.

Most of light source units adopt tubular light sources, such as cold-cathode fluorescent lamps, which extend in the direction of extension of the incidence surface. In recent years, however, there is a demand for reduction in power consumption in display devices that are applied to mobile equipment such as mobile phones.

To meet the demand, there has been proposed a surface light source device that uses, as light sources, self-luminous elements such as light-emitting diodes (LED), the power consumption of which is less than that of the cold-cathode fluorescent lamp (see Jpn. Pat. Appln. KOKAI Publication No. 2003-141918 and Jpn. Pat. Appln. KOKAI Publication No. 2003-187623, for instance).

The surface light source device using the point light sources such as light-emitting diodes is encountered by the problem of how to enhance the luminance. It is difficult to dispose many point light sources toward the incidence surface of the light guide within the limited space in the vicinity of the light guide. If many point light sources are to be disposed toward the incidence surface, the outside dimensions of the peripheral region of the light guide would increase and the thickness of the light guide would increase due to enlargement of the incidence surface. This prevents reduction in size.

The luminance of the surface light source device influences the display luminance of an object to be illuminated, for example, a transmissive liquid crystal display panel. Thus, in order to realize high luminance of the object to be illuminated, it is imperative to enhance the luminance of the surface light source device.

BRIEF SUMMARY OF THE INVENTION

The present invention has been made in consideration of the above-described problem, and the object of the invention is to provide a surface light source device that is capable of realizing high luminance with low power consumption, and reduction in size or thickness, and a display device including the surface light source device.

According to a first aspect of the present invention, there is provided a surface light source device comprising:
a light source unit;
a reflector that is disposed to surround the light source unit, and reflects radiation light from the light source unit; and
a light guide having an incidence surface, on which the radiation light from the light source unit is incident, and an emission surface from which incident light that is incident through the incidence surface is emitted,
wherein the light source unit includes a plurality of point light sources with different major radiation directions of radiation light and with different angles formed between the major radiation directions and the incidence surface.

According to a second aspect of the present invention, there is provided a display device comprising:
a transmissive liquid crystal display panel in which a liquid crystal layer is held between a pair of substrates; and
a surface light source device that illuminates the liquid crystal display panel,
the surface light source comprising:
a light source unit;
a reflector that is disposed to surround the light source unit, and reflects radiation light from the light source unit; and
a light guide having an incidence surface, on which the radiation light from the light source unit is incident, and an emission surface from which incident light that is incident through the incidence surface is emitted,
wherein the light source unit includes a plurality of point light sources with different major radiation directions of radiation light and with different angles formed between the major radiation directions and the incidence surface.

BRIEF DESCRIPTION OF THE SEVERAL VIEWS OF THE DRAWING

FIG. 1 schematically shows the structure of a surface light source device according to an embodiment of the present invention, and the structure of a display device including the surface light source device;

FIG. 2 schematically shows the structure of a light source unit of a surface light source device according to a first embodiment of the invention;

FIG. 3 shows an example of layout of the light source unit shown in FIG. 2;

DETAILED DESCRIPTION OF THE INVENTION

Figure 4:
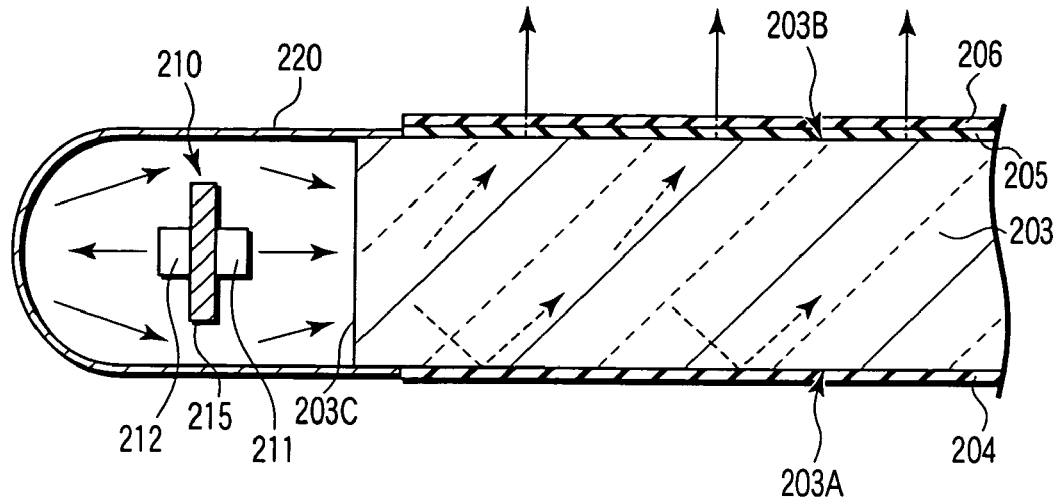
FIG. 4 is a view for explaining the operation of the surface light source device using the light source unit shown in FIG. 2.

A surface light source device according to an embodiment of the present invention and a display device including the surface light source device will now be described with reference to the accompanying drawings. As an example of the display device, a liquid crystal display device is described. The liquid crystal display device includes a surface light source device such as a backlight unit, and a transmissive liquid crystal display panel that selectively passes backlight from the backlight unit and displays an image.

Specifically, as is shown in FIG. 1, the liquid crystal display device includes a transmissive liquid crystal display panel 100, and a backlight unit 200 that illuminates the liquid crystal display panel 100. The liquid crystal display device includes a rectangular-frame-shaped bezel cover 300. The liquid crystal display panel 100 is held between the backlight unit 200 and the bezel cover 300. The liquid crystal display device further includes a control circuit board 400 that controls driving of the liquid crystal display panel 100. The liquid crystal display panel 100 and the control circuit board 400 are electrically connected via a flexible printed circuit board 500.

The liquid crystal display panel 100 is configured such that a liquid crystal layer is held between a pair of substrates. Specifically, the liquid crystal display panel 100 comprises a substantially rectangular array substrate 110, a substantially rectangular counter-substrate 120, and a liquid crystal layer 130 that is sealed between the pair of substrates via alignment films. The array substrate 110 and counter-substrate 120 are coupled to each other via a seal material 140. A display area for displaying an image is formed inside the seal material 140, and comprises a plurality of pixels PX that are arranged in a matrix.

The array substrate 110 includes a plurality of scan lines 111, a plurality of signal lines 112, switching elements 113 disposed in association with the respective pixels PX, and pixel electrodes 114 connected to the associated switching elements 113.

The scan lines 111 extend in a row direction of pixels PX. The signals lines extend in a column direction of pixels PX and cross the scan lines 111. The switching elements 113 are disposed near intersections between the scan lines 111 and signal lines 112. The switching element 113 is composed of, for example, a thin-film transistor (TFT), and includes a semiconductor layer such as an amorphous silicon film or a poly-silicon film. A gate electrode G of the thin-film transistor 113 is electrically connected to the scan line 111 (or formed integral with the scan line 111). A drain electrode D of the thin-film transistor 113 is electrically connected to the signal line 112 (or formed integral with the scan line 112). A source electrode S of the thin-film transistor 113 is electrically connected to the pixel electrode 114 (or formed integral with the pixel electrode 114). The pixel electrode 114 is formed of a light-transmissive, electrically conductive material such as indium-tin-oxide (ITO).

The counter-substrate 120 includes a counter-electrode 121. The counter-electrode 121 is formed of a light-transmissive, electrically conductive material such as ITO. The counter-substrate 120 may include, where necessary, color filter layers disposed in association with the respective pixels PX, and a black matrix that extends along peripheral edges of the color filter layers.

The liquid crystal display panel 100 with this structure is disposed on the backlight unit 200 and is opposed to an optical sheet 206 of the backlight unit 200. The bezel cover 300 is formed in a rectangular shape and has an opening through which the display area of the liquid crystal display device is exposed. The bezel cover 300 is engaged with the backlight unit 200 in the state in which the bezel cover 300 is laid on the periphery of the liquid crystal display panel 100. The bezel cover 300 is fixed to the backlight unit 200 by means of screws, etc. Thereby, the liquid crystal display panel 100 is fixed to the backlight unit 200 in the state in which the liquid crystal display panel 100 is held by the bezel cover 300.

The backlight unit 200 according to this embodiment comprises a hold frame 201, a light source receiving unit 202, a light guide 203, and a plurality (e.g. three) of optical sheets 204, 205 and 206.

The hold frame 201 is formed of a resin in a substantially rectangular frame-like shape. The hold frame 201 has a receiving recess portion 201A that can receive the light guide 203 and the plural optical sheets 204, 205 and 206.

The light guide 203 is formed of a light-transmissive resin in a rectangular shape with substantially the same size as the size of the receiving recess portion 201A of the hold frame 201. The light guide 203 may have a wedge shape with a thin portion on one end and a thick portion on the other end, or may have a flat plate shape with a uniform thickness. In this embodiment, the light guide 203 has a flat plate shape.

The optical sheet 204 is disposed on one major surface (back surface) 203A of the light guide 203. The optical sheet 204 is a reflective sheet that reflects light, which leaks from the major surface 203A of the light guide 203, back to the light guide 203. The optical sheet 204 is formed in a rectangular shape with substantially the same size as the size of the receiving recess portion 201A of the hold frame 201.

The optical sheets 205 and 206 are disposed on another major surface (front surface) 203B of the light guide 203. The optical sheets 205 and 206 impart predetermined optical characteristics to light that emerges from the major surface 203B. For example, the optical sheet 205 is a diffusion sheet that diffuses light emanating from the major surface 203B. The optical sheet 205 is formed in a rectangular shape with substantially the same size as the size of the receiving recess portion 201A. The optical sheet 205 is stacked on the major surface 203B. The optical sheet 206 is, for example, a prism sheet that converges light emerging from the major surface 203B, and is formed in a rectangular shape with substantially the same size as the size of the receiving recess portion 201A. The optical sheet 206 is stacked on the optical sheet 205.

FIRST EMBODIMENT

A backlight unit according to a first embodiment of the invention is described. As is shown in FIG. 2, the light source receiving unit 202 accommodates a light source unit 210 and a reflector 220. The light source unit 210 includes a plurality of point light sources 211 and 212 with different major radiation directions of radiation light.

One side surface 203C of the light guide 203 is situated to face the light source unit 210 and functions as an incidence surface on which radiation light from the light source unit 210 is incident. One major surface of the light guide 203, which intersects with the incidence surface 203C, functions as an emission surface from which the incident light coming in through the incidence surface 203C is emitted.

The reflector 220 is disposed so as to surround the light source unit 210. The reflector 220 reflects radiation light from the light source unit 210. The reflector 220 has, for example, a substantially U-shaped cross section. Both end portions 220A and 220B of the reflector 220 clamp the light guide 203 (incidence-surface side).

The light source unit 210 is disposed to face the incidence surface 203C of the light guide 203. The light source unit 210 includes a first point light source 211 and a second point light source 212, which have different angles between their major radiation directions and the incidence surface 203C. Specifically, the first point light source 211 emits light in a first major radiation direction 211X toward the incidence surface 203C. The second point light source 212 emits light in a second major radiation direction 212X toward the reflector 220.

The light source unit 210 includes a support base plate 215 that is disposed substantially parallel to the incidence surface. The support base plate 215 is formed in a flat plate shape, and supports the first point light source 211 and second point light source 212 at predetermined positions. The support base plate 215 includes a driving circuit for driving these point light sources.

The first point light source 211 and second point light source 212 are composed of white light-emitting diodes. The white light-emitting diode emits white light. Alternatively, it is possible to substitute a diode unit in which a red light-emitting diode, a green light-emitting diode and a blue light-emitting diode are combined and packaged, or a diode unit in which a blue light-emitting diode or an ultraviolet emitting diode is combined with a phosphor. The radiation light from the white light-emitting diode is radiated in the major radiation direction and is also diverged at a predetermined divergence angle with respect to the major radiation direction. The first point light source 211 is disposed on one major surface 215A of the support base plate 215 such that its emission surface 211A is substantially parallel to the incidence surface 203C (or such that the first major radiation direction is perpendicular to the incidence surface 203C). The first point light source 211 has the first major radiation direction 211X toward the incidence surface 203C.

The radiation light from the emission surface 211A of the first point light source 211 is radiated in the first major radiation direction 211X and is diverged at a predetermined divergence angle $\theta 1$ with respect to the first major radiation direction 211X. Thus, most of the radiation light from the first point light source 211 is directly incident on the incidence surface 203C. The angle between the first major radiation direction 211X of the radiation light from the first point light source 211 and the incidence surface 203C is about 90°.

Similarly, the second point light source 212 is disposed on the other major surface 215B of the support base plate 215 such that its emission surface 212A faces the reflector 220. The second point light source 212 has a second major radiation direction 212X toward the reflector 220. In short, the first major radiation direction 211X of the first point light source 211 and the second major radiation direction 212X of the second point light source 212 are opposite to each other.

The radiation light from the emission surface 212A of the second point light source 212 is radiated in the second major radiation direction 212X and is diverged at a predetermined divergence angle $\theta 2$ with respect to the second major radiation direction 212X. In other words, the radiation light from the second point light source 212 in the second major radiation direction 212X is not directly incident on the incidence surface 203C. This radiation light is once reflected by the reflector 220, and the reflective light is incident on the incidence surface 203C. That is, an angle is not defined between the second major radiation direction 212X of the radiation light from the second point light source 212 and the incidence surface 203C, and reflective light from the reflector 220 is incident on the incidence surface 203C at an angle that is less than 90°.

The major radiation direction, in this context, is defined as that one of radiation directions of radiation light from each point light source, in which a highest luminance is obtained. In addition, as regards the reflective light, the major radiation direction of reflective light is defined as that one of directions of reflective light incident on the incidence surface 203C, in which a highest luminance is obtained.

In the example shown in FIG. 2, the single first point light source 211 and the single second light source 212 are disposed on the associated major surfaces of the support base plate 215. Alternatively, a plurality of first point light sources and a plurality of second point light sources may be disposed in consideration of the size of the backlight unit, the area of the incidence surface, the emission luminance of the white light-emitting diode, the divergence angle of radiation light from the white light-emitting diode, etc.

For example, as shown in FIG. 3, a plurality of first point light sources 211 and a plurality of second point light sources 212 are disposed in a row in the direction of extension of the incidence surface 203C (indicated by arrow A). If a plurality of rows of point light sources are disposed on the major surfaces of the support base plate 215 in a direction (arrow B) in which the thickness of the light guide 203 is defined, it would become necessary to increase the width of the incidence surface 203C of the light guide 203 in the direction B, that is, the thickness of the incidence surface 203C. This leads to an increase in outside dimensions of the backlight unit, and reduction in size would not be realized. It is thus desirable to dispose the plural point light sources only in a single row in the direction A. In the meantime, in the case where each of the point light sources has a sufficiently small size and is sufficiently smaller than a minimum necessary thickness of the incidence surface 203C (i.e. with such a size as not to prevent reduction in size of the light guide 203), a plurality of rows of point light sources may be disposed in the direction B.

As is shown in FIG. 4, when the liquid crystal display device with this structure is operated, the major radiation light from the first point light source 211 of the light source unit 210 directly enters the light guide 203 through the incidence surface 203C of the light guide 203, and part of the radiation light is reflected by the reflector 220 and let into the light guide 203 through the incidence surface 203C. On the other hand, the radiation light from the second point light source 212 of the light source unit 210 is reflected by the reflector 220, and the reflective light enters the light guide 203 through the incidence surface 203C.

The direct incident light on the light guide 203 and the reflective light, which is once reflected by the reflector 220 and then made incident on the light guide 203, propagates through the inside of the light guide 203. Light, which leaks from the major surface 203A of the light guide 203, is reflected by the reflective sheet 204 back into the light guide 203.

The light that has propagated through the light guide 203 emerges from the emission surface 203B of the light guide 203 toward the diffusion sheet 205. The emission light from the emission surface 203B of the light guide 203 is diffused by the diffusion sheet 205 and guided to the entire surface of the liquid crystal display panel 100 through the prism sheet 206. In the liquid crystal display panel 100, the passing/ blocking of incoming light is selectively controlled on a pixel PX by pixel PX basis, and an image is displayed.

The luminance of the backlight unit of the first embodiment was compared to that of a backlight unit of a comparative example. In the backlight unit of the first embodiment, a predetermined number of first point light sources 211 are disposed in a row in the direction A on one major surface 215A of the support base plate 215. In addition, the same number of second point light sources 212 are disposed in a row in the direction A on the other major surface 215B of the support base plate 215. The respective point light sources emit light with substantially the same emission luminance. In the backlight unit of the comparative example, the same number of point light sources as the first point light sources are disposed in a row in the direction A on the side facing the incidence surface of the support base plate, and the respective point light sources emit light with substantially the same emission luminance as in the first embodiment.

The luminance of each backlight unit was measured by a luminance meter that is disposed at a predetermined distance from the emission surface of the backlight unit. It was found that the luminance of the backlight unit of the first embodiment was about 1.5 times as high as the luminance of the backlight unit of the comparative example.

According to the surface light source device of the first embodiment, the point light sources (light-emitting diodes) are used as light sources, and thus the power consumption is lower than in the case of using cold-cathode fluorescent lamps as light sources. In addition, since the plural point light sources with different major radiation directions are disposed, a high luminance can be obtained. Furthermore, since the layout that enables plural point light sources to be disposed in the limited space is adopted, it is possible to suppress an increase in outside dimensions of the surface light source device, and there is no need to enlarge the incidence surface of the light guide or to increase the thickness of the light guide. Thus, the surface light source device can be reduced in size.

Specifically, the light source unit is disposed to face the incidence surface of the light guide, and the light source unit comprises the first point light source that emits light in the first major radiation direction toward the incidence surface and the second point light source that emits light in the second major radiation direction toward the reflector. In particular, the light source unit includes the support base plate that is disposed substantially parallel to the incidence surface, the first point light source is disposed on one major surface of the support base plate, and the second point light source is disposed on the other major surface of the support base plate.

With this structure, the light source unit can make non-reflected light directly incident on the incidence surface, and reflective light, which is reflected by the reflector, incident on the incidence surface. Thus, compared to the structure wherein radiation light from all point light sources is made directly incident on the incidence surface, a greater number of point light sources can be disposed in the light source receiving unit of the limited size, and the luminance can be enhanced.

Besides, a plurality of first point light sources and a plurality of second point light sources are disposed in a row in the direction of extension of the incidence surface. With this structure, compared to the case in which a plurality of rows of point light sources are disposed in the direction of extension of the incidence surface, the width of the incidence surface (i.e. the thickness of the light guide) can be made thinner. In addition, it is possible to obtain substantially the same luminance as in the case of disposing point light sources in plural rows.

By adopting the above-described surface light source device with high luminance, the brightness of the object to be illuminated can be increased. In the case where the transmissive liquid crystal display panel is mounted as the object to be illuminated, the liquid crystal display device with high luminance can be provided. Moreover, since the compact-size surface light source device is used, a combinational structure with an object to be illuminated, for example, a display device, can be reduced in size and thickness.

According to the surface light source device of the first embodiment, the light source unit is reduced in size, and a high luminance can be obtained. Moreover, the thickness of the light guide can be reduced. Therefore, the surface light source device, which can be reduced in size and thickness, and the display device including the surface light source device, can be provided.

SECOND EMBODIMENT

Next, a backlight unit according to a second embodiment is described. The structure of the second embodiment is basically the same as that of the first embodiment, except for the structure of the light source unit. The common parts are denoted by like reference numerals, and a detailed description thereof is omitted.

Figure 5:
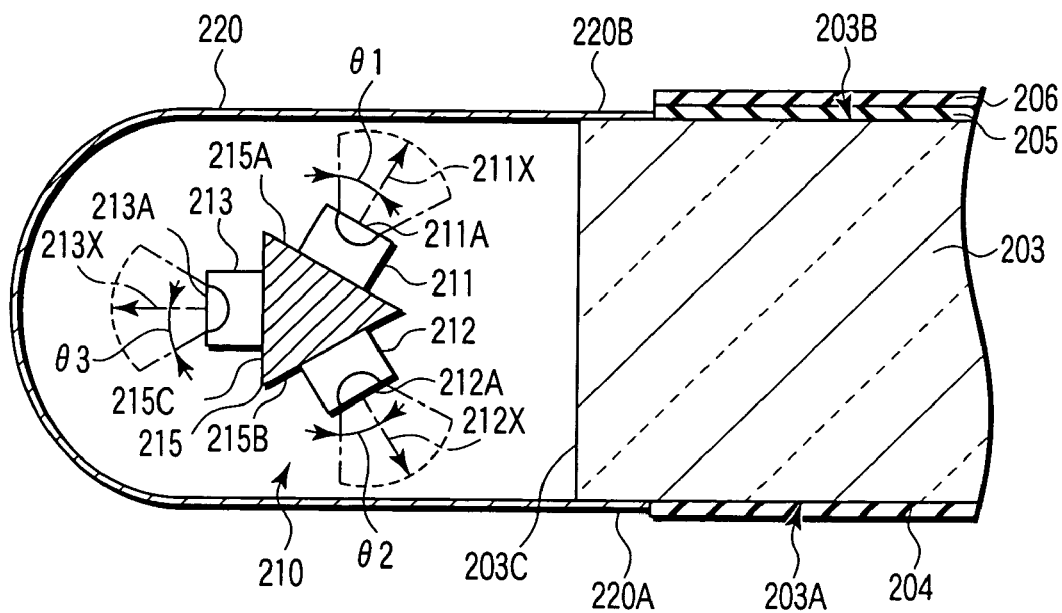
FIG. 5 schematically shows the structure of a light source unit of a surface light source device according to a second embodiment of the invention.

As is shown in FIG. 5, a light source receiving unit 202 accommodates a light source unit 210 and a reflector 220. The light source unit 210 includes a plurality of point light sources 211, 212 and 213 with different major radiation directions of radiation light.

The light source unit 210 is disposed to face the incidence surface 203C of the light guide 203. The light source unit 210 includes a first point light source 211, a second point light source 212 and a third point light source 213, which have different angles between their major radiation directions and the incidence surface 203C. Specifically, the first point light source 211 emits light in a first major radiation direction 211X toward the incidence surface 203C and reflector 220. The second point light source 212 emits light in a second major radiation direction 212X toward the incidence surface 203C and reflector 220. The third point light source 213 emits light in a third major radiation direction 213X toward the reflector 220.

The light source unit 210 includes a support member 215 that is disposed along the incidence surface 203C and has at least three major surfaces. The support member 215 is formed in a prism shape, and supports the first point light source 211, second point light source 212 and third point light source 213 at predetermined positions. The support member 215 includes a driving circuit for driving these point light sources. In this example, the support member 215 is formed in a triangular prism shape with three major surfaces 215A, 215B and 215C.

The first point light source 211, second point light source 212 and third point light source 213 are composed of white light-emitting diodes. The radiation light from the white light-emitting diode is radiated in the major radiation direction and is also diverged at a predetermined divergence angle with respect to the major radiation direction.

The first point light source 211 is disposed on the first major surface 215A of the support member 215 such that its emission surface 211A is directed to the reflector 220 (or directed to the incidence surface 203C). The first point light source 211 has the first major radiation direction 211X toward the reflector 220 (or toward the incidence surface 203C).

The radiation light from the emission surface 211A of the first point light source 211 is radiated in the first major radiation direction 211X and is diverged at a predetermined divergence angle θ1 with respect to the first major radiation direction 211X. Thus, part of the radiation light from the first point light source 211 is reflected by the reflector 220 and then made incident on the incidence surface 203C, and part of the radiation light from the first point light source 211 is directly incident on the incidence surface 203C.

Similarly, the second point light source 212 is disposed on the second major surface 215B of the support member 215 such that its emission surface 212A is directed to the reflector 220 (or directed to the incidence surface 203C). The second point light source 212 has a second major radiation direction 212X toward the reflector 220 (or toward the incidence surface 203C).

The radiation light from the emission surface 212A of the second point light source 212 is radiated in the second major radiation direction 212X and is diverged at a predetermined divergence angle θ2 with respect to the second major radiation direction 212X. Thus, part of the radiation light from the second point light source 212 is reflected by the reflector 220 and then made incident on the incidence surface 203C, and part of the radiation light from the second point light source 212 is directly incident on the incidence surface 203C.

The third point light source 213 is disposed on the third major surface 215C of the support member 215 such that its emission surface 213A faces the reflector 220. The third point light source 213 has a third major radiation direction 213X toward the reflector 220. In short, the first major radiation direction 211X of the first point light source 211, the second major radiation direction 212X of the second point light source 212 and the third major radiation direction 213X of the third point light source 213 are different from one another.

The radiation light from the emission surface 213A of the third point light source 213 is radiated in the third major radiation direction 213X and is diverged at a predetermined divergence angle θ3 with respect to the third major radiation direction 213X. In other words, the radiation light from the third point light source 213 in the third major radiation direction 213X is not directly incident on the incidence surface 203C. This radiation light is once reflected by the reflector 220, and the reflective light is incident on the incidence surface 203C. That is, an angle is not defined between the third major radiation direction 213X of the radiation light from the third point light source 213 and the incidence surface 203C, and reflective light from the reflector 220 is incident on the incidence surface 203C at an angle that is less than 90°.

In the example shown in FIG. 5, the single first point light source 211, the single second point light source 212 and the single third point light source 213 are disposed on the associated major surfaces of the support member 215. Alternatively, a plurality of first point light sources, a plurality of second point light sources and a plurality of third point light sources may be disposed in consideration of the size of the backlight unit, the area of the incidence surface, the emission luminance of the white light-emitting diode, the divergence angle of radiation light from the white light-emitting diode, etc.

Figure 6:
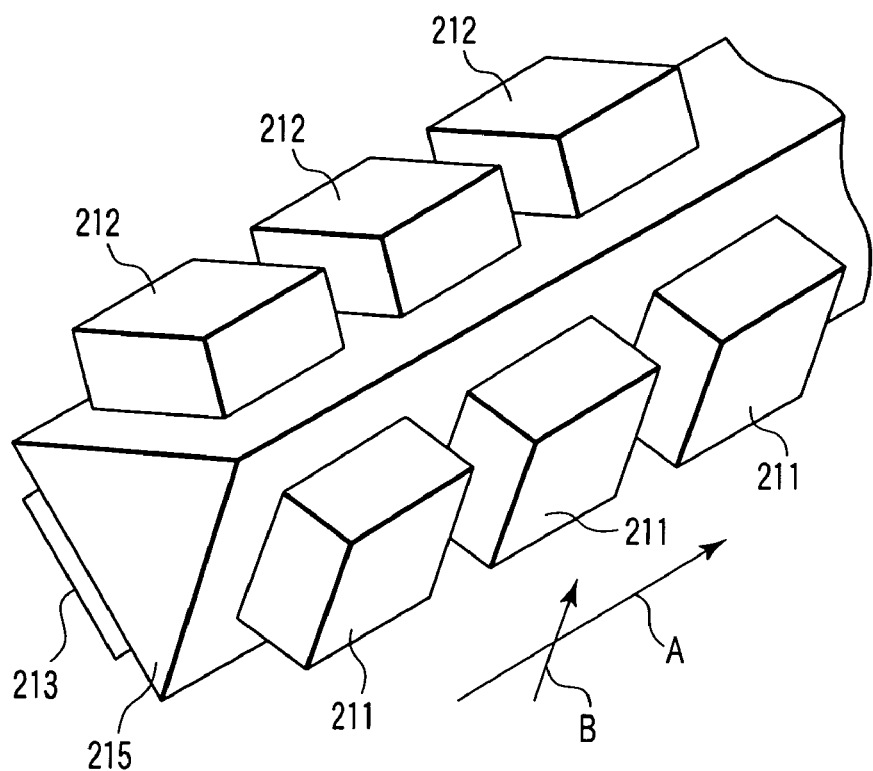
FIG. 6 shows an example of layout of the light source unit shown in FIG. 5.

For example, as shown in FIG. 6, a plurality of first point light sources 211, a plurality of second point light sources 212 and a plurality of third point light sources 213 are disposed in a row in the direction of extension of the incidence surface 203C (indicated by arrow A). In particular, it is desirable that the plural point light sources that are disposed on that major surface (e.g. third major surface 215C) of the support member 215, which is substantially parallel to the incidence surface 203C, be disposed in a row in the direction A.

In the case where a plurality of rows of point light sources are disposed on that major surface, which is substantially parallel to the incidence surface 203C, in a direction (arrow B) in which the thickness of the light guide 203 is defined, it would become necessary to increase the width of the incidence surface 203C of the light guide 203 in the direction B, that is, the thickness of the incidence surface 203C. This leads to an increase in outside dimensions of the backlight unit, and reduction in size would be prevented. It is thus desirable to dispose the plural point light sources on the major surface, which is parallel to the incidence surface 203C, only in a single row in the direction A.

In the meantime, in the case where each of the point light sources has a sufficiently small size and is sufficiently smaller than a minimum necessary thickness of the incidence surface 203C (i.e. with such a size as not to prevent reduction in size of the light guide 203), a plurality of rows of point light sources may be disposed in the direction B. In addition, unless reduction in size is prevented, a plurality of rows of point light sources may be disposed in the direction A on the major surface that is not parallel to the incidence surface 203C.

Figure 7:
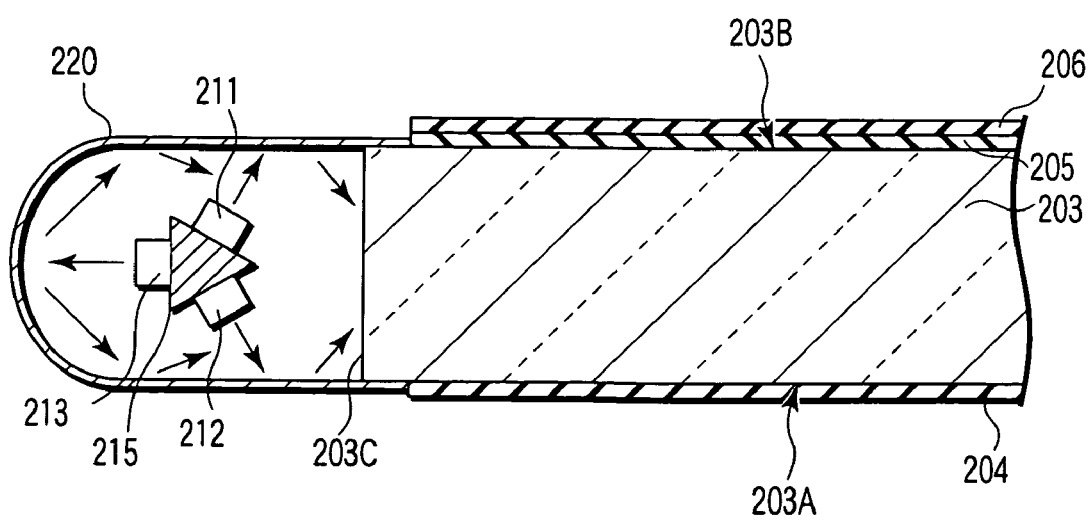
FIG. 7 is a view for explaining the operation of the surface light source device using the light source unit shown in FIG. 5.

As is shown in FIG. 7, when the liquid crystal display device with this structure is operated, the major radiation light from the first point light source 211 and second point light source 212 of the light source unit 210 directly enters the light guide 203 through the incidence surface 203C of the light guide 203, and part of the radiation light is reflected by the reflector 220 and let into the light guide 203 through the incidence surface 203C. On the other hand, the radiation light from the third point light source 213 of the light source unit 210 is reflected by the reflector 220, and the reflective light enters the light guide 203 through the incidence surface 203C.

The direct incident light on the light guide 203 and the reflective light, which is once reflected by the reflector 220 and then made incident on the light guide 203, propagates through the inside of the light guide 203. Light, which leaks from the major surface 203A of the light guide 203, is reflected by the reflective sheet 204 back into the light guide 203.

The light that has propagated through the light guide 203 emerges from the emission surface 203B of the light guide 203 toward the diffusion sheet 205. The emission light from the emission surface 203B of the light guide 203 is diffused by the diffusion sheet 205 and guided to the entire surface of the liquid crystal display panel 100 through the prism sheet 206. In the liquid crystal display panel 100, the passing/blocking of incoming light is selectively controlled on a pixel PX by pixel PX basis, and an image is displayed.

The luminance of the backlight unit of the second embodiment was compared to that of a backlight unit of a comparative example. In the backlight unit of the second embodiment, a predetermined number of first point light sources 211 are disposed in a row in the direction A on the first major surface 215A of the triangular-prismatic support member 215, the same number of second point light sources 212 are disposed in a row in the direction A on the second major surface 215B, and the same number of third point light sources 213 are disposed in a row in the direction A on the third major surface 215C. The respective point light sources emit light with substantially the same emission luminance. In the backlight unit of the comparative example, the same number of point light sources as the first point light sources are disposed in a row in the direction A on the side facing the incidence surface of the support base plate, and the respective point light sources emit light with substantially the same emission luminance as in the second embodiment.

The luminance of each backlight unit was measured by a luminance meter that is disposed at a predetermined distance from the emission surface of the backlight unit. It was found that the luminance of the backlight unit of the second embodiment was about twice as high as the luminance of the backlight unit of the comparative example.

According to the surface light source device of the second embodiment, like the first embodiment, the point light sources (light-emitting diodes) are used as light sources, and thus the power consumption is lower than in the case of using cold-cathode fluorescent lamps as light sources. In addition, since the plural point light sources with different major radiation directions are disposed, a high luminance can be obtained. Furthermore, since the layout that enables plural point light sources to be disposed in the limited space is adopted, it is possible to suppress an increase in outside dimensions of the surface light source device, and there is no need to enlarge the incidence surface of the light guide or to increase the thickness of the light guide. Thus, the surface light source device can be reduced in size.

Specifically, the light source unit is disposed to face the incidence surface of the light guide, and the light source unit includes the support member with at least three major surfaces that are opposed to the incidence surface at different angles, and further includes the plural point light sources that are disposed on these major surfaces.

With this structure, the light source unit can make non-reflected light directly incident on the incidence surface, and reflective light, which is reflected by the reflector, incident on the incidence surface. Thus, compared to the structure wherein radiation light from all point light sources is made directly incident on the incidence surface, a greater number of point light sources can be disposed in the light source receiving unit of the limited size, and the luminance can be enhanced.

Besides, a plurality of point light sources can be disposed on a plurality of major surfaces in a row in the direction of extension of the incidence surface. With this structure, compared to the case in which a plurality of rows of point light sources are disposed on one major surface in the direction of extension of the incidence surface, the width of the incidence surface (i.e. the thickness of the light guide) can be made thinner. In addition, it is possible to obtain substantially the same luminance as in the case of disposing point light sources in plural rows.

By adopting the above-described surface light source device with high luminance, the brightness of the object to be illuminated can be increased. In the case where the transmissive liquid crystal display panel is mounted as the object to be illuminated, the liquid crystal display device with high luminance can be provided. Moreover, since the compact-size surface light source device is used, a combinational structure with an object to be illuminated, for example, a display device, can be reduced in size.

According to the surface light source device of the second embodiment, the light source unit is reduced in size and a high luminance can be obtained. Moreover, the thickness of the light guide can be reduced. Therefore, it is possible to provide the surface light source device, in which a high luminance can be obtained with low power consumption and the reduction in size can be achieved, and the display device including the surface light source device.

In the second embodiment, point light sources are disposed on at least three major surfaces of the support member, and the divergence angles θ of radiation lights from the point light sources are controlled. Thereby, the radiation light from the light source unit can be radiated over the radiation angle of about 360° in a cross-sectional plane intersecting at right angles with the incidence surface and emission surface of the light guide. For example, in the case where a single point light source is disposed on each of the three major surfaces, the divergence angles θ1, θ2 and θ3 are set at about 60° (or more than 60°). Thereby, the radiation angle of the radiation light, which is about 360°, can be obtained. With a combination of such plural point light sources, the light source unit that functions like a tubular light source can be constructed.

Figure 8:
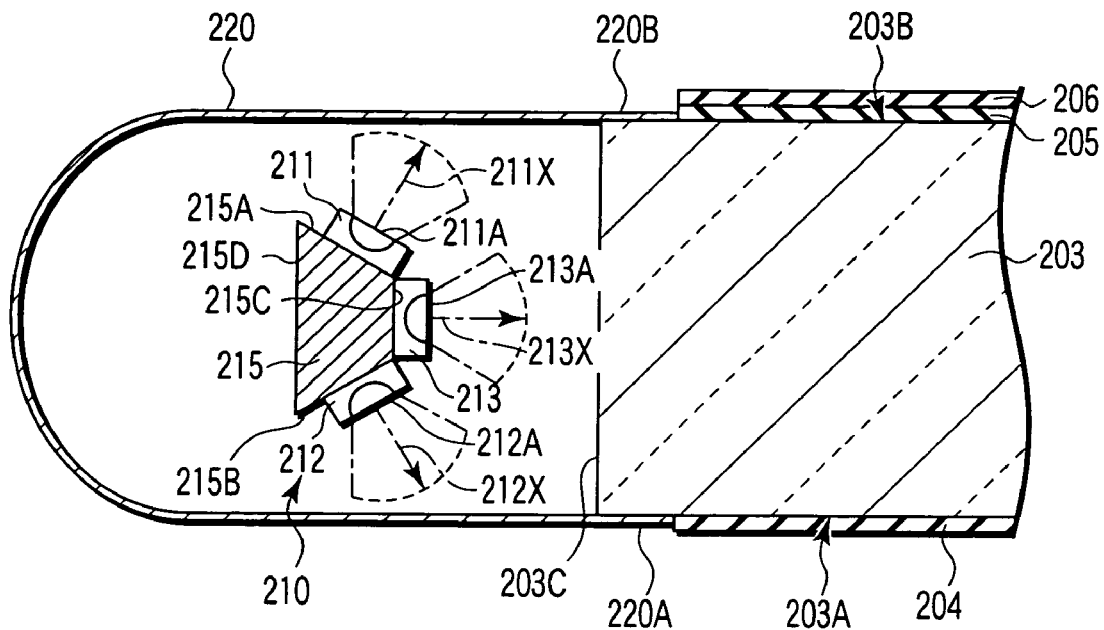
FIG. 8 schematically shows another structure of the light source unit of the surface light source device according to the second embodiment of the invention.

The second embodiment wherein the point light sources are disposed on at least three major surfaces may be modified to include a light source unit 210, as shown in FIG. 8. Specifically, the support member 215 is formed in a rectangular-prismatic shape with four major surfaces 215A, 215B, 215C and 215D.

A first point light source 211 is disposed on the first major surface 215A of the support member 215 such that its emission surface 211A is directed to the reflector 220 (or directed to the incidence surface 203C). The first point light source 211 has a first major radiation direction 211X toward the reflector 220 (or toward the incidence surface 203C). The angle between the first major radiation direction 211X and the incidence surface 203C is less than 90°.

Similarly, a second point light source 212 is disposed on the second major surface 215B of the support member 215 such that its emission surface 212A is directed to the reflector 220 (or directed to the incidence surface 203C). The second point light source 212 has a second major radiation direction 212X toward the reflector 220 (or toward the incidence surface 203C). The angle between the second major radiation direction 212X and the incidence surface 203C is less than 90°.

A third point light source 213 is disposed on the third major surface 215C of the support member 215 such that its emission surface 213A is substantially parallel to the incidence surface 203C (or a third major radiation direction 213X is perpendicular to the incidence surface 203C). The second point light source 212 has a third major radiation direction 213X toward the incidence surface 203C. The angle between the third major radiation direction 213X and the incidence surface 203C is about 90°. In short, the first major radiation direction 211X of the first point light source 211, the second major radiation direction 212X of the second point light source 212 and the third major radiation direction 213X of the third point light source 213 are different from one another, and the angles between these major radiation directions, on the one hand, and the incidence surface 203C, on the other hand, are also different.

According to this structure, the same advantageous effects as with the second embodiment can be obtained. In addition, since the third point light source is disposed to have the third major radiation direction toward the reflector 220, as shown in FIG. 5, the efficiency of use of light is enhanced, and high luminance is achieved.

Figure 9:
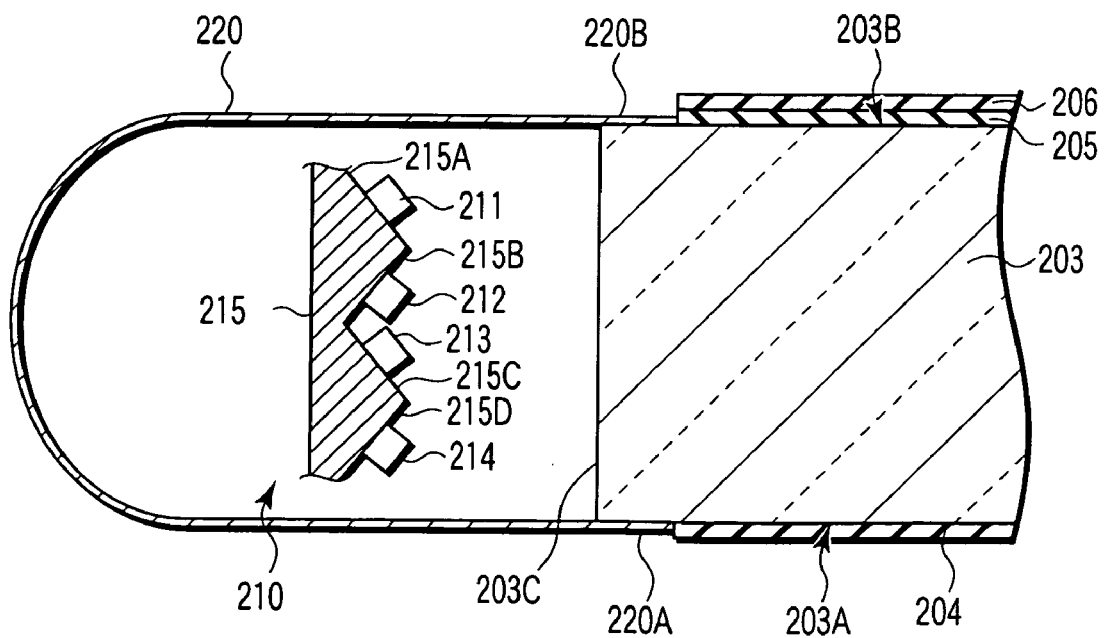
FIG. 9 schematically shows still another structure of the light source unit of the surface light source device according to the second embodiment of the invention.

In the case where each of the point light sources has a sufficiently small size and is sufficiently smaller than a minimum necessary thickness of the incidence surface 203C (i.e. with such a size as not to prevent reduction in size of the light guide 203), a light source unit 210 as shown in FIG. 9 may be constructed. Specifically, the support member 215 has a plurality of major surfaces 215A, 215B, 215C, 215D, which are arranged in a corrugated cross-sectional shape. A plurality of point light sources 211, 212, 213, 214, . . . , are disposed on the respective major surfaces. With this structure, the same advantageous effects as with the above-described embodiments can be obtained, and high luminance can be achieved.

Figure 10:
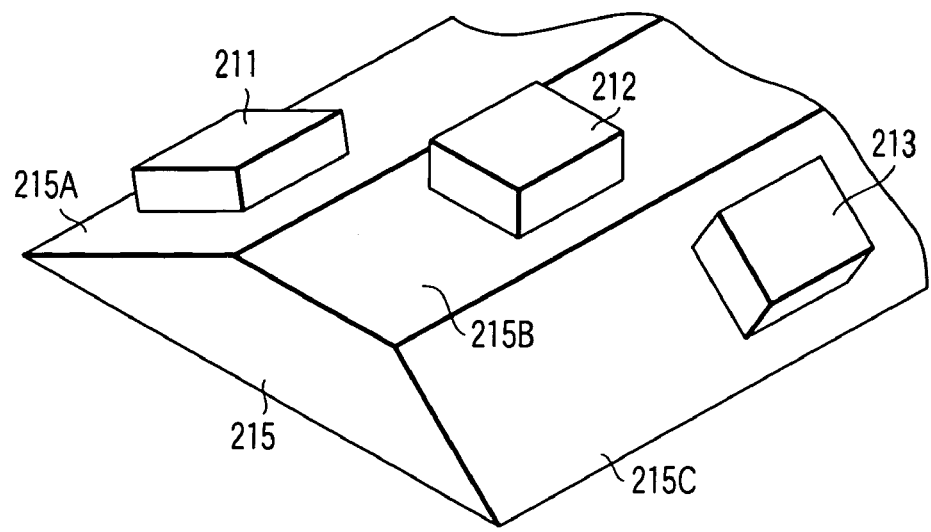
FIG. 10 schematically shows still another structure of the light source unit of the surface light source device according to the second embodiment of the invention.

The point light sources 211, 212, 213, . . . , on the major surfaces 215A, 215B, 215C, . . . , of the support member 215 may be arranged in a staggered fashion, as shown in FIG. 10.

The present invention is not limited to the above-described embodiments. At the stage of practicing the invention, various embodiments may be made by modifying the structural elements without departing from the spirit of the invention. Structural elements disclosed in the embodiments may properly be combined, and various inventions may be made. For example, some structural elements may be omitted from the embodiments. Moreover, structural elements in different embodiments may properly be combined.

For example, the light source unit is disposed along one side surface of the light guide. Alternatively, the light source unit may be disposed along a plurality of side surfaces of the light guide. With this structure, even in the case where the above-described surface light source device is applied to a large-sized display device, the thickness of the entire device is not greatly increased, and a sufficiently high luminance can be obtained with low power consumption.

In the above-described embodiments, the liquid crystal display device is described as an example of the display device. The invention is applicable to other types of non-self-luminous display devices that require surface light source devices. In the above-described embodiments, the surface light source device is described as a backlight unit. However, needless to say, the surface light source device may be used as a front light unit.

Figure 11:
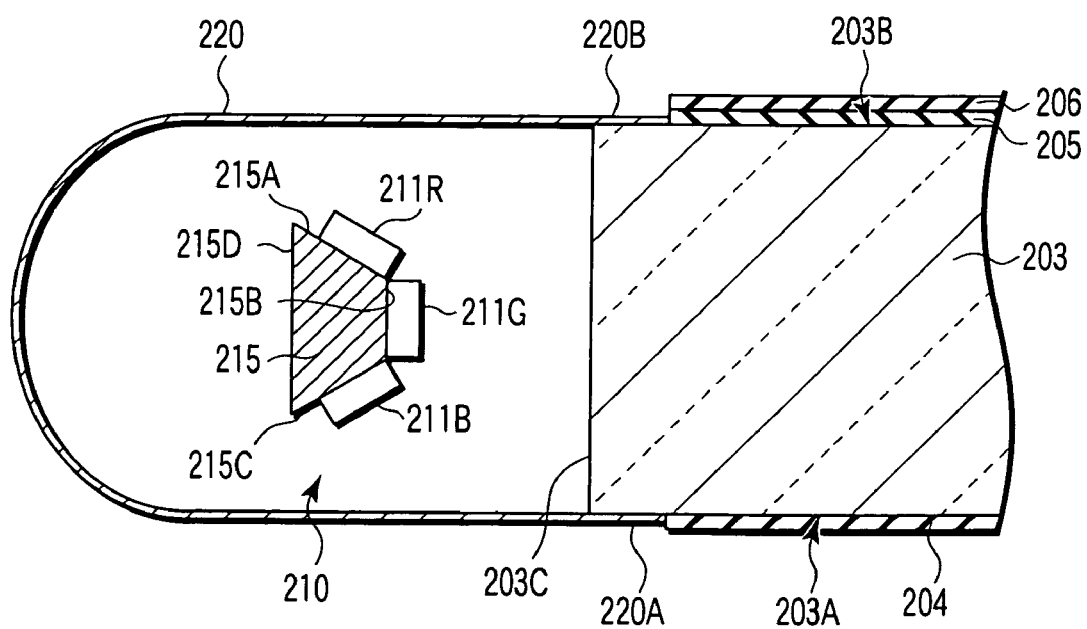
FIG. 11 schematically shows the structure of a light source unit of a surface light source device according to another embodiment of the invention.

In each of the above-described embodiments, the point light source is composed of a white light-emitting diode. However, the light source unit 210 may comprise, as point light sources, a red light-emitting diode, a green light-emitting diode and a blue light-emitting diode. The light-emitting diodes of the respective colors may be alternately arranged on the same major surface or, as shown in FIG. 11, a red light-emitting diode 211R may be disposed on the first major surface 215A, a green light-emitting diode 211G may be disposed on the second major surface 215B and a blue light-emitting diode 211B may be disposed on the third major surface 215C.

The liquid crystal display device, which comprises the red light-emitting diode, green light-emitting diode and blue light-emitting diode as point light sources, may include a driving control unit that can execute field-sequential driving. The field-sequential driving is a driving scheme in which a color image of one frame is composed of three fields of the three primary colors of red, green and blue. Specifically, the control circuit board 400 has a function of a driving control unit that controls the driving of the liquid crystal display panel 100 and the light source unit 210 of the backlight unit 200 in accordance with color image signals for red, green and blue.

This type of liquid crystal display device operates as follows. The first field drives the liquid crystal display panel 100 on the basis of an image signal for red, and turns on the red light-emitting diode 211R of the light source unit 210, thereby illuminating the liquid crystal display panel 100. The second field drives the liquid crystal display panel 100 on the basis of an image signal for green, and turns on the green light-emitting diode 211G of the light source unit 210, thereby illuminating the liquid crystal display panel 100. The third field drives the liquid crystal display panel 100 on the basis of an image signal for blue, and turns on the blue light-emitting diode 211B of the light source unit 210, thereby illuminating the liquid crystal display panel 100. Thus, color display can be effected, with color filters being dispensed with.

Figure 12:
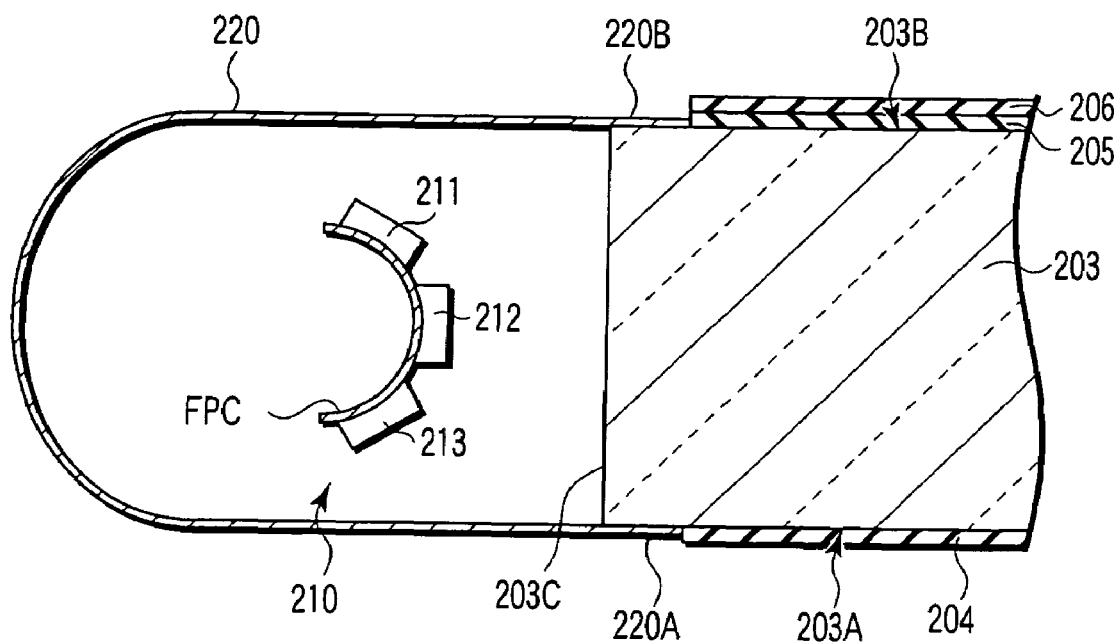
FIG. 12 schematically shows the structure of a light source unit of a surface light source device according to still another embodiment of the invention.

In each of the above-described embodiments, the point light sources are disposed on the support member. Alternatively, as shown in FIG. 12, a plurality of point light sources may be disposed on a flexible print circuit (FPC), for instance, and the FPC may be bent and disposed within the reflector.

As has been described above, it is desirable that the plural point light sources with different major radiation directions be disposed at different positions on a circle that is defined about an axis extending along the incidence surface 203C, or at different positions on an ellipse that has a major axis and a minor axis which intersect with the axis extending along the incidence surface 203C.

The present invention can provide a surface light source device that is capable of realizing high luminance with low power consumption, and reduction in size or thickness, and a display device including the surface light source device.

What is claimed is:

1. A surface light source device comprising:
a light source unit;
a reflector that is disposed to surround the light source unit, and reflects radiation light from the light source unit; and
a light guide having an incidence surface, on which the radiation light from the light source unit is incident, and an emission surface from which incident light that is incident through the incidence surface is emitted,
wherein the light source unit includes a plurality of point light sources with different major radiation directions of radiation light with respect to the incidence surface and with mutually different angles formed between the major radiation directions and the incidence surface.

2. The surface light source device according to claim 1, wherein the light source unit is disposed to face the incidence surface, and
the plurality of point light sources of the light source unit includes a first point light source that emits radiation light in a first major radiation direction toward the incidence surface, and a second point light source that emits radiation light in a second major radiation direction toward the reflector.

3. The surface light source device according to claim 1, wherein the radiation light from the light source unit is radiated over a radiation angle of about 360° in a cross-sectional plane intersecting at right angles with the incidence surface and emission surface.

4. The surface light source device according to claim 1, wherein the point light sources are white light-emitting diodes.

5. The surface light source device according to claim 1, wherein the light source unit includes a support base plate that is disposed substantially parallel to the incidence surface, and the plurality of point light sources of the light source unit includes a first point light source that is disposed on one major surface of the support base plate to face the incident surface, and a second point light source that is disposed on the other major surface of the support base plate to face the reflector.

6. The surface light source device according to claim 5, wherein a plurality of said first light sources and a plurality of said second light sources are disposed in a direction of extension of the incidence surface.

7. The surface light source device according to claim 1, wherein the light source unit includes, as the point light sources, a red light-emitting diode, a green light-emitting diode and a blue light-emitting diode.

8. The surface light source device according to claim 7, wherein the light source unit includes a support member that is disposed along the incidence surface and has at least three major surfaces, the red light-emitting diode is disposed on a first major surface of said at least three major surfaces of the support member, the green light-emitting diode is disposed on a second major surface of said at least three major surfaces of the support member, and the blue light-emitting diode is disposed on a third major surface of said at least three major surfaces of the support member.

9. The surface light source device according to claim 1, wherein the light source unit includes a support member that is disposed along the incidence surface and has at least three major surfaces, and the plurality of point light sources are disposed on the major surfaces of the support member.

10. The surface light source device according to claim 9, wherein the point light sources on the major surfaces of the support member are disposed in a direction of extension of the incidence surface.

11. The surface light source device according to claim 9, wherein the point light sources on the major surfaces of the support member are disposed in a staggered fashion.

12. A display device comprising:

a transmissive liquid crystal display panel in which a liquid crystal layer is held between a pair of substrates; and a surface light source device that illuminates the liquid crystal display panel, the surface light source comprising:

a light source unit;

a reflector that is disposed to surround the light source unit, and reflects radiation light from the light source unit; and a light guide having an incidence surface, on which the radiation light from the light source unit is incident, and an emission surface from which incident light that is incident through the incidence surface is emitted, wherein the light source unit includes a plurality of point light sources with mutually different major radiation directions of radiation light with respect to the incidence surface and with mutually different angles formed between the major radiation directions and the incidence surface.

13. The display device according to claim 12, wherein the plurality of point light sources include, as the point light sources, a red light-emitting diode, a green light-emitting diode and a blue light-emitting diode, and the display device further comprises a driving control unit that controls driving of the liquid crystal display panel and the light source unit in accordance with color image signals for red, green and blue.

* * * * *